United States Patent
Jones

(10) Patent No.: US 12,200,003 B2
(45) Date of Patent: *Jan. 14, 2025

(54) NETWORK SECURITY TECHNIQUES COMPARING OBSERVED DISTRIBUTIONS TO BASELINE DISTRIBUTIONS

(71) Applicant: KOUNT INC., Boise, ID (US)

(72) Inventor: Matthew Lewis Jones, Boise, ID (US)

(73) Assignee: Kount Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,821

(22) Filed: Sep. 27, 2023

(65) Prior Publication Data

US 2024/0022587 A1 Jan. 18, 2024

Related U.S. Application Data

(63) Continuation of application No. 17/389,159, filed on Jul. 29, 2021, now Pat. No. 11,777,972.

(60) Provisional application No. 63/059,606, filed on Jul. 31, 2020.

(51) Int. Cl.
*H04L 29/06* (2006.01)
*H04L 9/40* (2022.01)

(52) U.S. Cl.
CPC .......... *H04L 63/1425* (2013.01); *H04L 63/10* (2013.01)

(58) Field of Classification Search
CPC ............................ H04L 63/1425; H04L 63/10
See application file for complete search history.

(56) References Cited

U.S. PATENT DOCUMENTS 7,808,916 B1 * 10/2010 Futamura ............ H04L 63/1416
370/242
11,082,442 B1 8/2021 Kolman et al.

OTHER PUBLICATIONS

U.S. Appl. No. 17/389,159, Non-Final Office Action, Mailed on Jan. 18, 2023, 38 pages.
U.S. Appl. No. 17/389,159, Notice of Allowance, Mailed on May 30, 2023, 15 pages.

* cited by examiner

*Primary Examiner* — Evans Desrosiers
(74) *Attorney, Agent, or Firm* — Kilpatrick Townsend & Stockton LLP

(57) ABSTRACT

A method described herein involves various operations directed toward network security. The operations include accessing a traffic attribute describing a feature of network traffic. The operations further include determining a baseline distribution for the traffic attribute of a baseline set of transactions involving an online system over a baseline period and, additionally, determining an observed distribution for the traffic attribute of an observed set of transactions involving the online system over an observed period. Using the observed distribution and the baseline distribution, an attribute risk value for the traffic attribute is computed. The operations further include detecting that an anomaly exists in the traffic attribute of the observed set of transactions, based on the attribute risk value. Responsive to detecting the anomaly, an access control is implemented for access to the online system by additional transactions having a particular value in the traffic attribute meeting a pattern of the anomaly.

20 Claims, 5 Drawing Sheets

NETWORK SECURITY TECHNIQUES COMPARING OBSERVED DISTRIBUTIONS TO BASELINE DISTRIBUTIONS

CROSS-REFERENCE TO RELATED APPLICATIONS

This application is a continuation of U.S. Ser. No. 17/389,159, filed Jul. 29, 2021 and titled "Network Security Techniques Comparing Observed Distributions To Baseline Distributions," which claims the benefit and priority under 35 U.S.C. 119(e) of U.S. Provisional Application No. 63/059,606, filed Jul. 31, 2020 and titled "Aggregating Anomalies Across Baseline Distributions to Identify Attack Vectors," the entire contents of which are herein incorporated by reference.

TECHNICAL FIELD

The present disclosure relates generally to network security. More specifically, this disclosure relates to network security techniques that involve comparing observed distributions of network traffic attributes to baseline distributions that represent expectations for those network traffic attributes.

BACKGROUND

Network security is a key issue for devices operating over a data network. Generally, network security involves data policies and practices to protect a data network, including online systems operating as part of that data network, from malicious activity that could harm network operations or entities associated with the data network. Network security can involve detecting malicious use of the data network, and often, malicious use is characterized by anomalies in network traffic over the data network.

To facilitate networks security, some existing organizations store information relating to fraudulent transactions performed by attackers over one or more data networks. The information may include traffic attributes describing such transactions, including, for example, known IP addresses, email addresses, devices, or other traffic attributes that have been associated with fraud. When one of those same traffic attributes (e.g., an IP address) is subsequently used to initiate a new transaction, a target of the transaction can identify the traffic attribute as flagged (i.e., known to be associated with fraud) and can therefore prevent the transaction from completing based on the known fraudulent history, thereby potentially preventing further fraud.

However, sophisticated attackers use a large number of traffic attributes, including, for instance, multiple IP addresses, email addresses, or physical device, during attacks such as credential stuffing, card testing, or other attack types. Due to the use of varying traffic attributes, an attacker might continue to complete fraudulent transactions because not all of the attacker's available traffic attributes are flagged. Thus, with these existing systems alone, fraudulent transactions can proceed undetected simply by masking the attacker's identity through the use of unflagged traffic attributes.

SUMMARY

Various aspects of the present disclosure provide techniques for providing network security by detecting anomalous network traffic and applying access controls responsive to such anomalous network traffic. Because anomalous network traffic can represent fraud, examples described herein can enhance network security through the detection and prevention of fraud.

Some examples are executed by a network security system operating in conjunction with an online system to provide network security related to the online system. For instance, various transactions occur between client devices and the online system. For a feature of network traffic involving the online system, an example of the network security system determines a baseline distribution describing the expected appearance of that feature in network traffic involving the online system during a baseline period. During operation, the network security system observes additional network traffic involving the online system over an observed period and, from that network traffic, determines an observed distribution for the feature. One or both of the observed distribution and the baseline distribution can be determined using exponential smoothing to weight the importance of more recent network traffic over older network traffic. The network security system compares the observed distribution to the baseline distribution, and if the two differ, the network security system identifies this variance as an anomaly and, as such, implements an access control to restrict access to the online system. In this manner, the network security system can detect and prevent fraud appearing as anomalies.

In some examples, comparing the observed distribution to the baseline distribution involves, applied to one or both of the observed distribution or the baseline distribution, use of one or more of a respective fast mean, fast standard deviation, slow mean, or slow standard deviation. For instance, the observed distribution can be characterized by a fast mean and fast standard deviation of the appearance of the feature during a short term of the observed period and can be characterized by a slow mean and slow standard deviation during a comparatively longer term of the observed period. Additionally or alternatively, the baseline distribution can be characterized by a fast mean and fast standard deviation of the appearance of the feature during a short term of the baseline period and can be characterized by a slow mean and slow standard deviation during a comparatively longer term of the baseline period. Through such characterizations, the network security system can allow for variances in non-anomalous network traffic over time.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Certain aspects and features of the present disclosure relate to implementing network security by determining risk associated with one or more traffic attributes, by comparing an observed distribution of traffic attributes in a set of transactions to a baseline distribution of the traffic attributes in another set of transactions. The baseline distribution can include a distribution of expected traffic attributes, such as an expected amount of web traffic from an IP address or from a specific geographic location. The observed distribution can include a distribution of traffic attributes associated with actual transactions, also referred to herein as interactions, received by a network security system. From the baseline distribution and the observed distribution, and embodiment of the network security system computes a risk value, which can be a score indicating the likelihood that the transaction is fraudulent or otherwise anomalous. Based on the risk value, also referred to herein as a score, the network security system can apply an access control to restrict anomalous transactions.

As described above, existing systems attempt to determine whether a transaction may be involved with fraudulent activity, based on the use of IP addresses or other attributes historically associated with fraud. This is a limited solution because a nefarious actor may attack an online system using more sophisticated techniques. For example, the nefarious actor may use an IP address not historically associated with fraud. Additionally, the nefarious actor may use a large set of IP addresses to attack the online system, such that not all of such IP addresses are known to be associated with fraud.

Examples described herein provide improvements in the technical field of network security. Existing systems are lacking because they prevent only those transactions using traffic attributes that are already known to be associated with fraud. However, some examples of a network security system described herein can prevent fraud involving traffic attributes that are not yet known to be associated with fraud. As a result, fraudulent transactions can be identified and prevented with an increased level of accuracy, thus providing a more secure network.

Overview of a Network Security System

Figure 1:
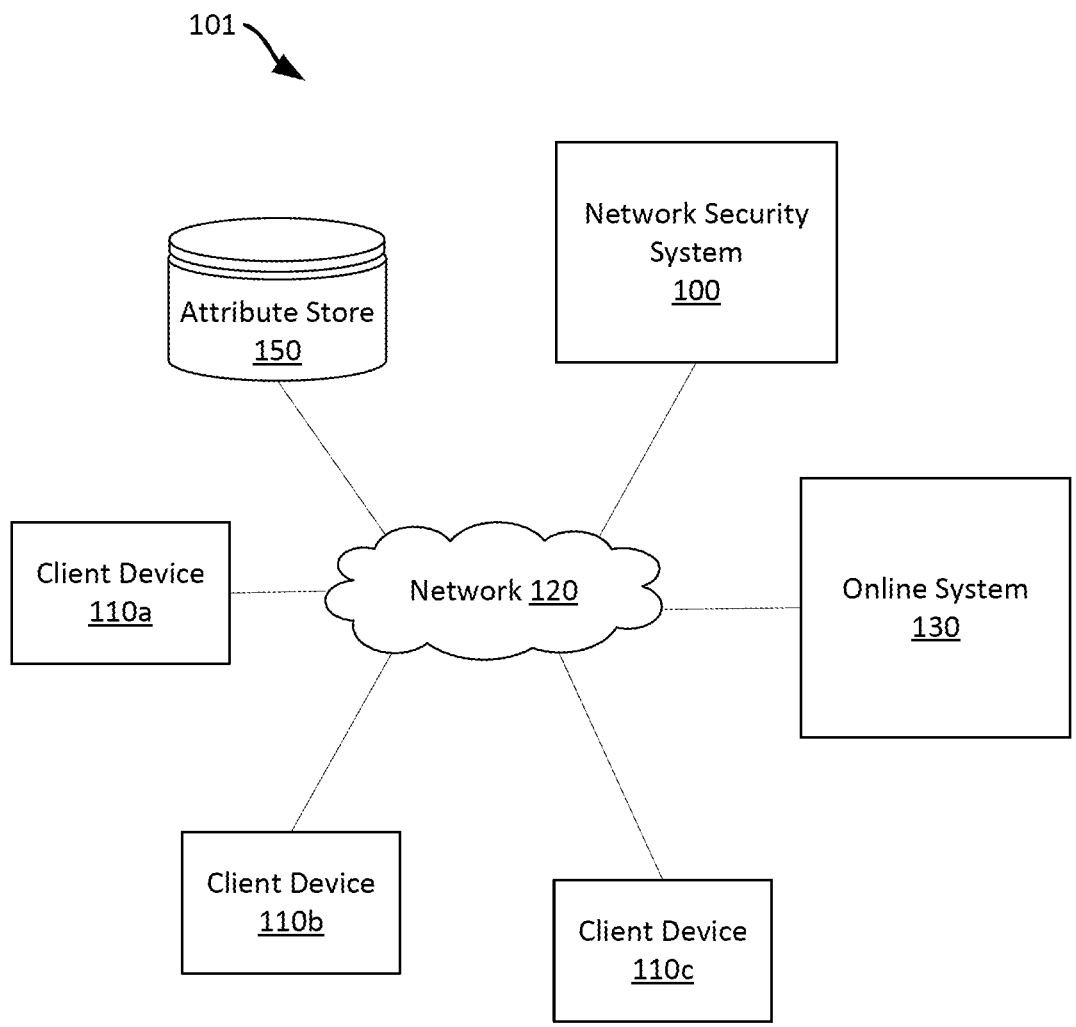
FIG. 1 is a diagram of a system environment for a network security system, according to one example of the present disclosure.

Referring now to the drawings, FIG. 1 is a block diagram of a system environment 101 for a network security system 100, according to an example of the present disclosure. The system environment 101 can include one or more client devices 110, such as a first client device 110a, a second client device 110b, and a third client device 110c; a network 120; one or more online systems 130; the network security system 100; and an attribute store 150. Additionally or alternatively, the system environment 101 can include other suitable components. Generally, in some examples, the client devices 110 perform transactions involving the online system 130 over the network 120. The network security system 100 monitors such transactions to identify anomalous activity indicative of fraud and, upon detecting such anomalous activity, can implement access controls to prevent the fraud.

Some examples of the network security system 100 described herein can detect sophisticated network attacks related to the online system 130 based on distributions of traffic attributes. For a traffic attribute, an example of the network security system 100 determines a baseline distribution of the traffic attribute over a first period. The first period may be a historical period of time, which can have varying lengths, such as one month, one year, or the entire history of known transactions. In some examples, the first period is an exponential time window, in which more recent events are weighted more heavily than older events. The network system 100 also determines an observed distribution of the traffic attribute over a second period, which is a period for which anomalous activity is being detected. The second period can be a short period of time, such as five seconds, a minute, an hour, or a day. In some examples, the second period is shorter than the first period. In some examples, the second period is an exponential time window, in which more recent events are weighted more heavily than older events. The network security system 100 may use exponential smoothing, with exponential time windows, to determine the baseline distribution, the observed distribution, or a combination thereof.

In some examples, the network security system 100 determines a risk, represented by a risk value, by comparing the observed baseline distribution for a traffic attribute to the baseline distribution for the traffic attribute. For instance, if the observed distribution includes a frequency for a feature of an attribute (e.g., a frequency at which a particular value occurs) that is two or more standard deviations away from the feature of the attribute in the baseline distribution, the network security system 100 may determine that the risk of one or more transactions in the second period indicates fraudulent activity. By using the baseline distribution and the observed distribution, the network security system 100 can detect attacks on an online system 130 of a network 120 more accurately as compared to existing systems.

Transactions can be various types of online interactions performed between devices over the network 130. An example of a transaction involves a client device 110 communicating with the online system 130. Specifically, for instance, a transaction is a login attempt, an account creation, an identity verification process, a financial transaction, or other suitable interaction. Each transaction has a set of traffic attributes describing characteristics of that transaction. Traffic attributes may include, for example, an IP address of the client device 110, a country of origin, a hosting type, an Internet service provider, a device type, or other suitable attributes. The online system 130 provides to the network security system 100 data describing such transactions, thus enabling the network security system 100 to monitor the transactions for anomalous activity and to implement access controls as needed.

The client devices 110 can be one or more computing devices capable of receiving user input as well as transmitting or receiving data via the network 120. In some examples, a client device 110 can be a consumer device such as a personal computing device or other suitable types of user devices. The client device 110 can be a conventional computer system such as a desktop or a laptop computer. Alternatively, the client device 110 may be a device having computer functionality such as a personal digital assistant (PDA), a mobile telephone, a smartphone, or other suitable device. The client device 110 can be configured to communicate via the network 120. In some examples, the client device 110 can execute an application allowing a user of the client device 110 to interact with the online systems 130. For example, the client device 110 can execute a browser application to enable interaction between the client device 110 and the online systems 130 via the network 120. In some examples, the client device 110 can interact with the online systems 130 through an application programming interface (API) running on a native operating system of the client device 110, such as IOS® or ANDROID™.

A client device 110 can be configured to communicate via the network 120, which may include any combination of local area networks or wide area networks, using wired communications systems, wireless communication systems, or a combination thereof. In some examples, the network 120 can use standard communications technologies or protocols. For example, the network 120 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format such as hypertext markup language (HTML) or extensible markup language (XML). In some examples, all or some of the communication links of the network 120 may be encrypted using any suitable technique or techniques.

One or more online systems 130 may be coupled to the network 120 for communicating with the network security system 100, which is further described below with respect to FIG. 2. In some examples, the online system 130 can be an application provider communicating information describing applications for execution by the client device 110, or communicating data to client devices 110 for use by an application executing on the client device 110. The online system 130 can be operated by a third party and can provide a graphical user interface for users to conduct transactions with the third party using the client device 110. In some examples, the online system 130 can provide content or other information for presentation via the client device 110. The online system 130 can communicate information to the network security system 100 describing transactions between the online system 130 and the client devices 110.

The online system 130 may include a web server that can link the online system 130 via the network 120 to the one or more client devices 110, as well as to the network security system 100. The web server can serve web pages, as well as other content such as JAVA®, FLASH®, XML, and the like. The web server may receive and route messages between the online system 130 and the client device 110. The web server may receive transaction requests to perform an action such as to login to an account or to create an account. Additionally, the web server may provide application programming interface (API) functionality to send data directly to native client device operating systems.

The attribute store 150 can store traffic attributes describing past transactions, which can include transactions previously marked as fraudulent or a combination of both those as well as legitimate transactions. The attribute store 150 can take various forms, such as one or more tables, databased, text files, or other storage objects. The traffic attributes maintained in the attribute store 150 include, for example, IP addresses, locations, connection types, geographic location, media access control (MAC) address, operation system, client device information, or other suitable information related to transactions. In some examples, the traffic attributes may include an IP routing type, such as "aol," "aolpop," "aoldialup," "aolproxy," "pop," "superpop," "satellite," "cache proxy," "international proxy," "regional proxy," or "mobile gateway." The attributes may additionally include a connection type such as "ocx," "tx," "consumer satellite," "framerelay," "dsl," "cable," "isdn," "dialup," "fixed wireless," "mobile wireless," or "unknown." The traffic attributes may include an anonymizer status such as "private," "active," "suspect," "inactive," "unknown," indicating whether the associated transactions have been anonomized. The traffic attributes may include a proxy level such as "anonymous," "distorting," "elite," or "transparent." The traffic attributes may include a proxy type such as "service," "socks," "socks http," "tor," or "unknown," or "web." The traffic attributes may include a hosting facility presence such as "True," or "False." The traffic attributes may include a line speed such as "high," "medium," or "low." The traffic attributes may include an Internet Service Provider or a country code. The attributes can additionally or alternatively include other suitable attributes. In the attribute store 150, each transaction may be associated with a value for each traffic attribute for which information is known about that transaction.

The attribute store 150 may include stored attributes for possible IP addresses, or a subset of possible IP addresses. The attribute store 150 can be configured to provide the attributes to a requesting entity based on IP addresses or other information provided to the attribute store 150 by a requesting entity, such as the online system 100.

Figure 2:
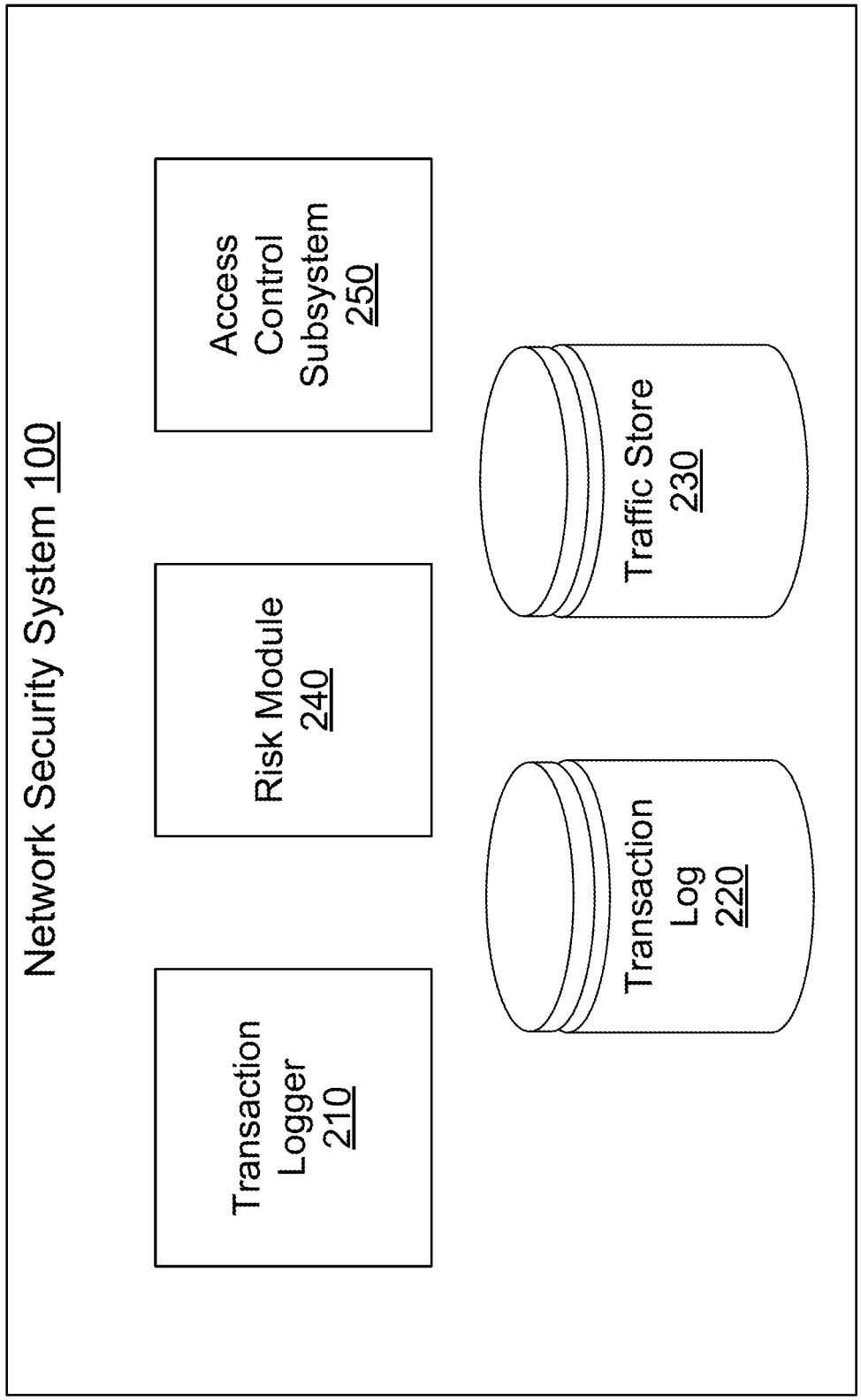
FIG. 2 is a diagram of a network security system, according to an example of the present disclosure.

FIG. 2 is a diagram of an architecture of the network security system 100, according to an example of the present disclosure. The network security system 100 can include a transaction logger 210, a transaction log 220, a traffic store 230, a risk module 240, and an access control subsystem 250. The subsystems of the network security system 100, such as the transaction logger 210, the transaction log 220, the traffic store 230, the risk module 240, and the access control subsystem 250 may be implemented as hardware, software, or a combination of both. Although these subsystems are described as being distinct, such distinction is for illustrative purposes only, and these subsystems can share hardware or software or can be further divided. Further, in some examples, the network security system 100 may include additional, fewer, or different components for various applications. Some example additional components, such as network interfaces, security functions, load balancers, failover servers, management and network operations consoles, and the like, are not shown so as to not obscure the details of the system architecture.

The transaction logger 210 can be configured to receive traffic attributes from the online system 130. Each time a client device 110 conducts a transaction with the online system 130, the network security system 100 can receive traffic attributes associated with the transaction. The transactions may include a login attempt, a lost password request, a purchase of an item or service, an account creation attempt, some other transaction between an entity and the online system 130, or a combination thereof. The traffic attributes may include an IP address, a time stamp, an email address, a phone number, a physical address, a user ID, network attributes of the transaction, device characteristics, behavioral characteristics of the entity, a merchant ID, items purchased, a transaction amount, or a combination thereof. The transaction logger 210 can receive traffic attributes from the online system 130. The transaction logger 210 may receive additional traffic attributes from the attribute store 150. For example, the transaction logger 210 may receive an IP address from the online system 130, and the transaction logger 210 may request additional traffic attributes related to the IP address from the attribute store 150. The transaction logger 210 can be configured to store the traffic attributes in the transaction log 220. Additionally, actions the entity performs via an application associated with the online system 130 and executing on the client device 110 may be communicated to the transaction logger 210 by the application for recordation in the transaction log 220.

The transaction log 220 can include one or more databases, or other storage objects, configured to store transaction data. The transaction data can include traffic attributes for transactions conducted with online systems 130. The transaction data may include additional traffic attributes received from the attribute store. The traffic attributes may be received from the transaction logger 210. The transaction data may include a fraud attribute. The fraud attribute may indicate whether the transaction was determined to be a fraudulent transaction. The fraud attribute may be created at the time of the creation of the traffic attributes. In some examples, the fraud attribute may be added to previously stored transaction data to indicate that a transaction was determined to be fraudulent after the fact.

The traffic store 230 stores objects that each represent baseline distributions of traffic for online systems 130. The baseline distributions may be based on attributes of historical transactions for an online system 130. The transactions for the online system 130, which are stored in the transaction log 220, may be sorted by attribute values. For example, the transactions may be sorted based on a type of network used by user clients, such as residential, business, mobile, or hosted. For each online system 130, the traffic store 230 can store baseline distributions for each attribute. The baseline distribution for an attribute can indicate the frequency with which attribute values are observed during previous transactions conducted with the online system 130.

The risk module 240 can be configured to identify transactions that may be fraudulent. The risk module 240 can be configured to detect an observed distribution for transactions being conducted with the online system 130. The observed distribution may be measured over an observed time period, which may, but need not, be at or near a current time such as within one second, one minute, one hour, or one day of the current time. The observed traffic distribution may be separately identified for each measurable attribute. The risk module 240 may receive traffic attributes from the online system 130. The risk module 240 may receive additional traffic attributes from the attribute store 150.

The risk module 240 may be configured to compare the observed traffic distribution to the baseline traffic distributions stored in the traffic store 230. Based on a difference between the measured traffic distribution and the baseline distribution, the risk module 240 can calculate a risk value for each traffic attribute. The risk module 240 can statistically aggregate the risk values of each attribute to obtain an overall risk value for potential attack vectors attempting to conduct transactions with the online system 130.

In some examples, the access control subsystem 250 implements an access control or other remediation activity responsive to transactions being deemed anomalous by the risk module 240. The access control subsystem 250 can perform various remediation activities. In one example, the access control subsystem 250 either directly or indirectly blocks transactions, at least temporarily. To this end, for instance, the access control subsystem 250 notifies the online system 130 of the anomalous activity, such that the online system 130 can deny further transactions meeting the pattern of that anomalous activity (e.g., having common values of traffic attributes as in the anomalous activity). Additionally or alternatively, in an example in which the online system 130 seeks approval from the network security system 100 before approving each interaction, the access control subsystem 250 can deny such approval, such that the online system 130 rejects further transactions that meet the pattern of detected anomalous activity. Various implementations of access controls are possible and are within the scope of this disclosure.

In another example, the access control subsystem 250 activates an additional authentication requirement before allowing such transactions to occur. To this end, for instance, the access control subsystem 250 notifies the online system 130 of the anomalous activity, such that the online system 130 can require an additional authentication step for such transactions. Additionally or alternatively, in an example in which the online system 130 seeks approval from the network security system 100 before approving each transaction, the access control subsystem 250 can notify the online system 130 of any additional requirements (e.g., further authentication), such that the online system 130 requests that the client device 110 involved in the transaction comply with the additional requirements before an interaction can be approved.

In one specific example, if the network security system determines that one of the traffic attributes, such as the country of origin, includes a high risk, the network security system 100 may recommend challenging web traffic to the online system 130 that is associated with the country of origin. Challenging web traffic may include requesting a higher degree of authentication information from an entity associated with the transaction or other suitable techniques for preventing fraudulent transactions from succeeding. In one example, if an unusually high amount of traffic from Spain is detected, for instance, then the network security system may recommend challenging traffic from Spain. In some examples, the network security system 100 may, instead of outputting a recommendation, automatically challenge any web traffic determined to match the pattern of a detected anomaly.

Figure 3:
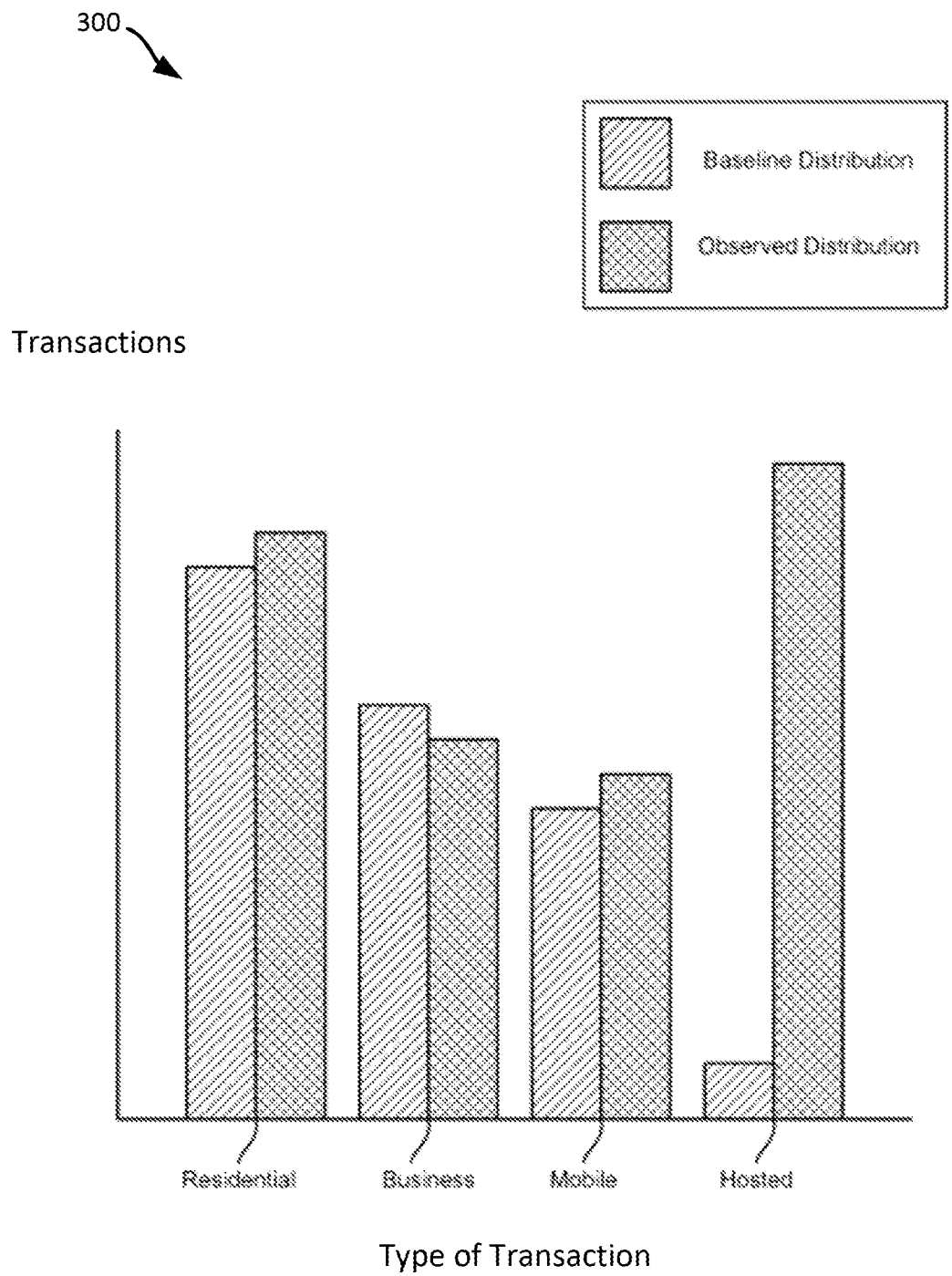
FIG. 3 is a graph of a baseline distribution and an observed distribution associated with a traffic attribute, according to an example of the present disclosure.

FIG. 3 is a graph 300 of a baseline distribution and an observed distribution associated with a traffic attribute according to one example of the present disclosure. In this example, the graph is a bar graph illustrating a baseline traffic distribution and an observed traffic distribution for an online system 130 that is under attack from multiple attack vectors. The observed traffic distribution can include a combination of non-fraudulent traffic and fraudulent traffic. The graph 300 shows that, for the baseline distribution, the largest number of transactions are conducted via a residential network, followed by business networks, mobile connections, and finally hosted networks. This baseline traffic distribution may be known by the network security system 100. The baseline traffic distribution may be unknown by attackers, which do not have access to this information.

The graph 300 shows, for the observed distribution, a small change in traffic relative to the baseline distribution associated with residential, business, and mobile networks, but a large increase in traffic may be associated with hosted networks. The difference between the baseline distribution and the observed traffic distribution indicates that the online system 130 may be receiving unusual traffic, which may indicate that the online system 130 may be receiving fraudulent transaction attempts. For example, an attacker that does not have the knowledge of the baseline distribution may be launching a large number of attack vectors from hosted networks. The network security system 100 may perform a fraud scoring technique to calculate a risk value for the observed traffic distribution.

The network security system 100 may perform a fraud scoring technique on observed traffic distributions for multiple traffic attributes. The network security system 100 may combine the calculated risk values for multiple traffic attributes to obtain a combined risk value, as further described with respect to FIG. 4.

Examples of Operations

Figure 4:
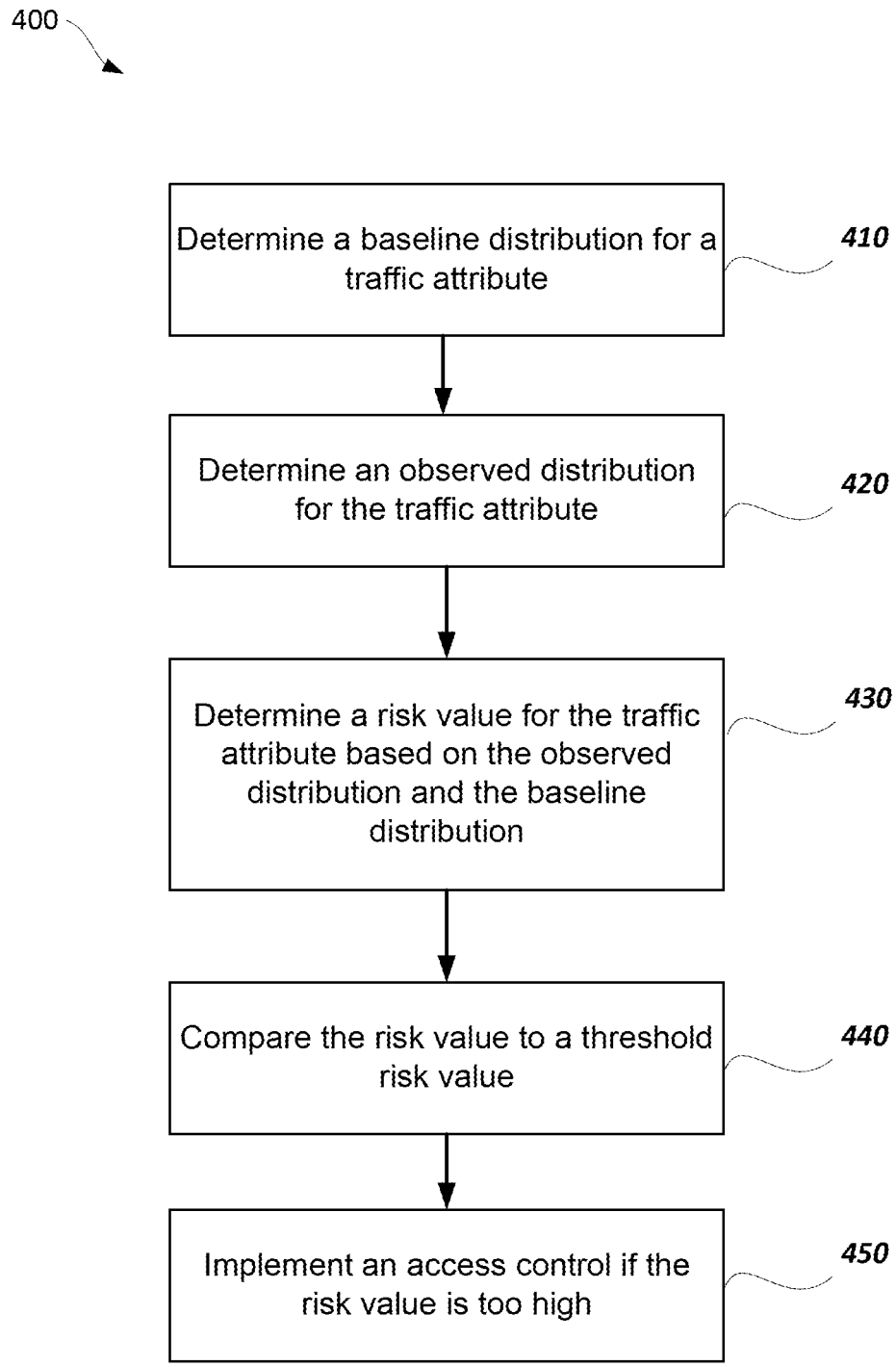
FIG. 4 is a flow diagram of a process to determine risk associated with a traffic attribute, according to an example of the present disclosure.

FIG. 4 is a flow diagram of a process 400 to determine risk associated with a traffic attribute, according to an example of the present disclosure. In some examples, the network security system 100 performs this process 400 or similar for each traffic attribute. Further, for a given traffic attribute, this process 400 or similar 400 may be performed periodically, each time with a new observed distribution and possibly with an updated or baseline distribution (e.g., updated to include prior observed distributions as well). The process 400 depicted in FIG. 4 may be implemented in software (e.g., code, instructions, program) executed by one or more processing units of a computer system, implemented in hardware, or implemented in a combination of software and hardware. The process 400 presented in FIG. 4 and described below is intended to be illustrative and non-limiting. Although FIG. 4 depicts various processing operations occurring in a particular sequence or order, this is not intended to be limiting. In certain alternative examples, the processing may be performed in a different order or some operations may also be performed in parallel.

As shown in FIG. 4, at block 410, the network security system 100 determines a baseline distribution for a traffic attribute over a first period, also referred to as a baseline period, where that first period may be a historical period. The network security system 100 may receive traffic attributes for transactions from an online system 130. The network security system 100 may store the traffic attributes in a transaction log 220. The network security system 100 may request additional traffic attributes from an attribute store 150 based on IP addresses associated with the traffic attributes. The network security system 100 may store the additional traffic attributes in the transaction log 220. The network security system 100 may generate the baseline distribution based on the traffic attributes and the additional traffic attributes stored in the transaction log 220. The network security system 100 may generate a baseline distribution for each of the traffic attributes. An example of the baseline distribution represents values of the traffic attribute for historical transactions with the online system 130.

In some examples, the network security system 100 facilitates network security for multiple online system 130. In that case, each such online system 130 may be associated with a respective baseline distribution for each traffic attribute that is independent of the baseline distributions for that traffic attribute associated with other online systems 130. This is because, in many cases, each online system 130 may be unique in some respect and may thus be associated with different expectations for its traffic. However, in some other examples, a baseline distribution is shared across online systems 130, or the baseline distribution for one online system 130 may be based on one or more baseline distributions for one or more other online systems 130. Various implementations are possible and are within the scope of this disclosure.

At block 420, the network security system can determine an observed distribution for the traffic attribute over a second period, also referred to as an observed period, where the second period may be a current or recent period for which fraud detection is sought. The network security system 100 may determine a respective observed distribution for each of the traffic attributes. The observed distribution may represent the attribute values for an observed set of transactions conducted with the online system 130. The observed set of transactions may include transactions conducted within the observed period, such as within the previous one minute, one hour, one day, or any other suitable time frame. An observed distribution may also be based on an observed period that is a previous time frame including a start time and end time.

At block 430, the network security system 100 determines, based on a comparison between the observed distribution and the baseline distribution, an attribute risk value for the traffic attribute. The network security system 100 may calculate an attribute risk value for each of the traffic attributes, such that each attribute risk value is associated with a respective traffic attribute and, further, is associated with the trends related to that respective traffic attribute in each of the observed distribution for that traffic attribute and the baseline distribution for that traffic attribute. In some examples, the network security system 100 determines the attribute risk value based on a slow filter and a fast filter as applied to compute the observed distribution, based on a slow filter and a fast filter as applied to compute the baseline distribution, or a combination of both.

In some examples, computation of the attribute risk value considers the number of standard deviations from the baseline distribution at a single point in time or averaged over multiple points in time. An example of the distribution technique includes an exponential smoothing function using two exponential mean filters on two different timescales to detect anomalies in time-series traffic in real-time or near real-time. The two exponential mean filters include a slow filter that keeps track of a long term (e.g., weekly) events and a fast filter that keeps track of a comparatively short term (e.g., hourly or daily). Each mean filter may be calculated based on a moving time window, which can be an exponential time window incorporating exponential smoothing such that the weights of events decay exponentially with age, characterized by a mean and a standard deviation. The time window for the slow filter may be longer than the time window for the fast filter, or in the case of exponential time windows, the rate of decay can be lower for the slow filer than for the fast filter. The mean and standard deviation for the slow filter are referred to herein as the slow mean and slow standard deviation, and the mean and standard deviation for the fast filter are referred to herein as the fast mean and fast standard deviation.

In some examples, the baseline distribution (i.e., the expected distribution) is calculated for "normal" circumstances (i.e., in the absence of any anomalous behavior). By comparing properties of one or more observed distributions representing network traffic over an observed period to properties of the baseline distribution, an example of the network security system 100 can detect anomalies if the observed distribution presents a statistically significant difference for a particular feature (i.e., a particular value of an attribute) as compared to the baseline distribution. In making such comparisons, an example of the network security system 100 performs one or more of the following operations: (a) determines the observed distribution by using a slow filter and a fast filter as applied to the network traffic over an observed period, such as by defining the observed distribution as a function of on the slow mean or slow standard deviation, or both, and as a function of the fast mean or fast standard deviation, or both, of the appearance of a feature (e.g., the frequency at which a network attribute takes a given value) in the network traffic over the observed period, (b) determines the baseline distribution by using a slow filter and a fast filter as applied to the network traffic over a baseline period, such as by defining the baseline distribution as a function of on the slow mean or slow standard deviation, or both, and as a function of the fast mean or fast standard deviation, or both, of the appearance of the a feature in the network traffic over the baseline period, or (c) a combination of both.

To illustrate the benefits of using both a fast filter and a slow filter on either or both of the baseline distribution or the observed distribution, the following example is provided. Over a particular time period of non-anomalous traffic for an online system 130, one can determine a frequency at which a particular feature appears in the network traffic. For instance, the feature is origination in the United Kingdom (UK), and in this example, 50% of the transactions making up the network traffic have that feature with a variance of +/−5% on an hourly basis. This distribution is the baseline distribution, which forms the expectation for each given hour of network traffic involving transactions with the online system 130.

At a particular hour after the baseline distribution is determined, the online system 100 might have 70% of its network traffic coming from the UK. If this single hour as compared to the baseline distribution as is, then this observed traffic appears anomalous because 70% exceeds 50%+/−5%. However, a determination of anomalousness based on this data alone does not take into account that the baseline distribution, 50+/−5% in this example, can also vary on a weekly basis or seasonally or due to various factors.

The above example computes only a fast mean (50%) and fast standard deviation (5%) for the network traffic for determining the baseline distribution. However, an example of the network security system 100 additionally computes a slow mean that accounts for longer-scale variations. For instance, the slow mean can be computed over the span of a week and, when combined with the fast mean and fast standard deviation, can provide a baseline distribution of 50%+/−20%. In that case, a frequency of 70% at a given hour could indicate the lack of an anomaly.

To capture potential variations in non-anomalous network traffic, an example of the network security system 100 uses a fast mean and a slow mean to add more flexibility to the comparison of the observed distribution to the baseline distribution, where that flexibility is based on trends in the network traffic across two timescales, specifically, a fast or shorter timescale and a slow or longer timescale. For instance, an example of the network security system 100 aggregates the slow mean and the fast mean of the observed distribution; the network security system 100 takes an average of the slow mean of the observed distribution (i.e., representing transactions during the observed period) and the fast mean of the observed network traffic, adds on a multiple of (e.g., two times) both the slow and fast standard deviations, and compares the result to the baseline distribution. Another example of the network security system 100 aggregates the slow mean and the fast mean of the baseline network traffic (i.e., transactions during the baseline period); the network security system 100 compares the observed distribution to an average of the fast mean and the slow mean of the baseline network traffic added to a multiple of (e.g., two times) both the slow and fast standard deviations of the baseline network traffic. Other implementations are also within the scope of this disclosure.

In FIG. 4, at block 440, the network security system 100 then compares the risk value for each traffic attribute to a respective threshold risk value. In some examples, the threshold risk value is the same for each traffic attribute, but in other examples, the threshold risk value varies per attribute so as to reflect a varying amount of fluctuation allowed for each traffic attribute. If a risk value for a traffic attribute meets (e.g., equals or exceeds) the respective threshold attribute value, then the network security system 100 deems the transactions represented in the observed distribution to be anomalous. Otherwise, if no risk values for the traffic attributes meet their respective threshold risk values, or if a quantity of risk values meeting their threshold risk values is fewer than a threshold quantity, then the network security system 100 can deem the transactions non-anomalous.

In some examples, additionally or alternatively to comparing individual risk values associated with individual attributes to respective threshold risk values, the network security system 100 computes a combined risk value and compares the combined risk value to a combined threshold. The network security system 100 may statistically aggregate multiple attribute risk values to obtain the combined risk value for recent transactions. The multiple attribute risk values may be aggregated by using the statistical mean of the attribute risk values, by using the maximum of the attribute risk values, by using the sum of the attribute risk values, by using the $\ell_2$ norm of the attribute risk values, by using the number of interquartile ranges from the median, by smoothing over time using a moving window, by using exponential smoothing over time, or by any other suitable function. The combined risk value may be an indication that, regardless of whether individual risk values appear anomalous, there may be anomalous activity nonetheless. If the combined risk value exceeds the combined threshold, an example of the network security system 100 may then either implement an access control, as described below, or may more closely analyze the individual attributes, such as by lowering the threshold risk values for the risk values of individual attributes to identify potentially anomalous transactions.

At block 450, the network security system 100 implements an access control if one or more of the traffic attributes had risk values exceeding their respective threshold risk values, or if the combined risk value exceeded its combined threshold. Specifically, an example of the network security system 100 applies the access control to transactions that fit a pattern of the anomalous activity. For instance, if the traffic attribute exceeding its threshold risk value describes geographic location, then the network security system 100 identifies which geographic locations are receiving an increase in traffic, and the network security system 100 applies the access control to those transactions that are incoming.

The access control can take various forms and may vary based on the traffic attribute associated with the anomaly or based on the specific risk value computed for that traffic attribute. In some examples, the access control subsystem 250 of the network security system 100 directly or indirectly provides access controls for each transaction fitting the pattern of the anomaly. To this end, for instance, the access control subsystem 250 notifies the online system 130 of the type of transaction to restrict (e.g., transactions having certain values in the traffic attribute having anomalous activity), and in turn, the online system 130 increases security for each such transaction (e.g., by blocking the transaction or requiring further authentication). Additionally or alternatively, the access control subsystem 250 can directly block such transactions, at least temporarily, such as in a case in which the network security system 100 has to approve each individual transaction for the online system 130.

In some examples, a transaction fitting the pattern of the anomaly may be approved, denied, or queued for further review based on the combined risk value. In some examples, the network security system 100 may block all transactions associated with a particular attribute having a high risk value. For example, a fraudulent device farm may include many devices in a building being used to post fake reviews, promote social media posts, sow dissonance, or otherwise perform fraudulent transactions. In such a case, each device may include a different IP address, but the Internet service provider may be similar. Accordingly, the network security system 100 may choose to deny transaction requests associated with the Internet service provider.

In some examples, the transaction may be subjected to further verification based upon the risk value. For example, the network security system 100 may challenge the transaction request by forwarding the transaction request to two-factor or multi-factor authentication, may request that the requestor entity answer security questions, may require a Captcha, may require some other security verification which increases friction to dissuade malicious behavior, or a combination thereof. Such procedures may allow non-fraudulent transactions from a particular Internet service provider to be processed when high numbers of fraudulent transaction requests are being received from the same Internet service provider.

Additionally or alternatively to the above, in some examples, the risk values may be utilized to provide information unrelated to fraud data. The risk values may represent a deviation from normal traffic distributions. For example, in response to a merchant launching a sale or new product in a specific region, the merchant may receive abnormally high traffic in that region. The abnormally high traffic may contribute to a high risk value, which may be used to evaluate the success of the event. The merchant may utilize the risk values to inform future resource usage, such as modifying marketing and sales efforts in particular regions based on the risk values.

Examples of a Computing System Implementing a Network Security System

Figure 5:
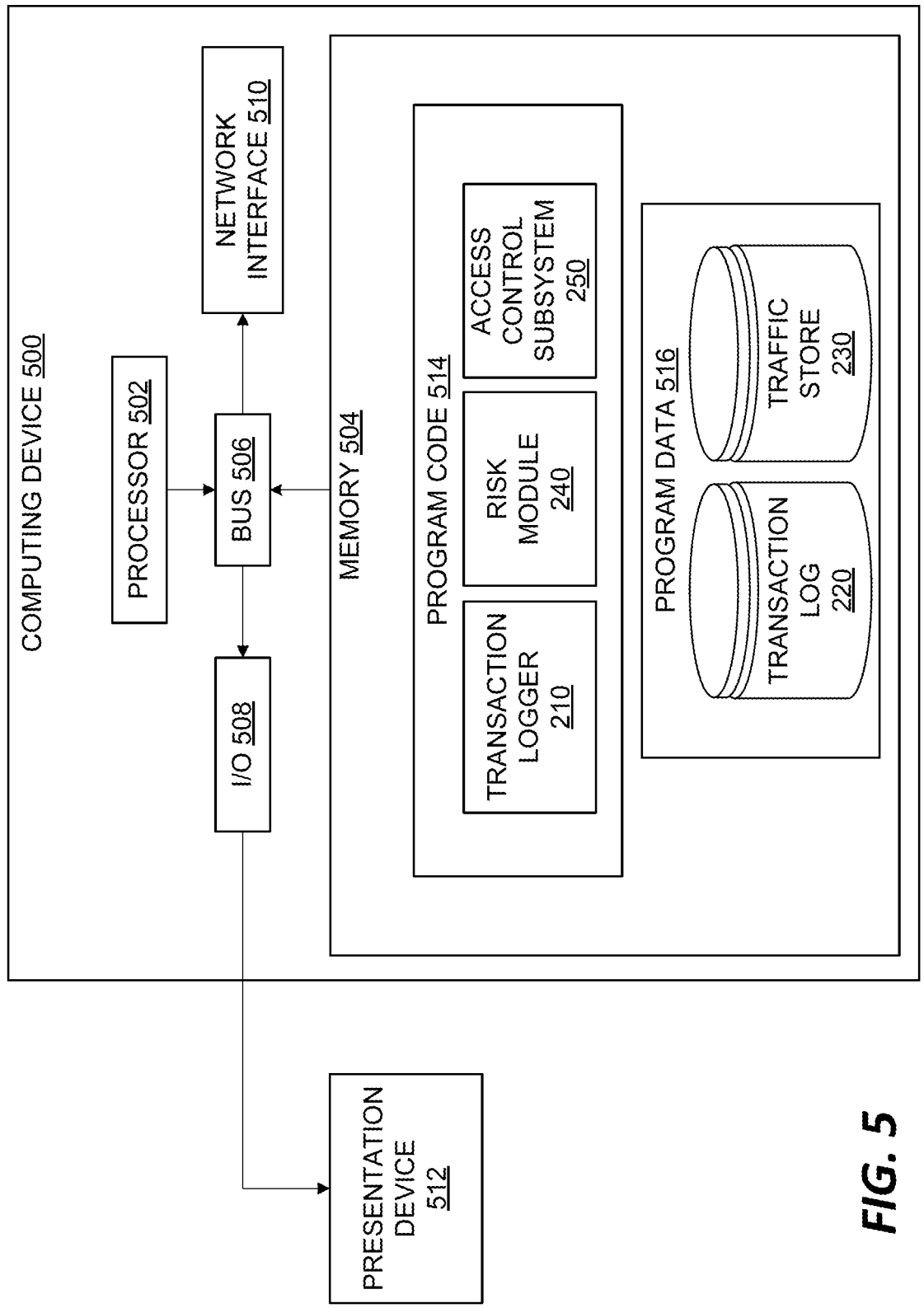
FIG. 5 is a diagram of a computing system suitable for implementing aspects of the techniques and technologies presented herein, according to an example of the present disclosure.

Any suitable computing system or group of computing systems can be used to perform the operations for the operations described herein. For example, FIG. 5 is a block diagram depicting an example of a computing device 500, which can be used to implement the network security system 100 according to one example of the present disclosure. The computing device 500 can include various devices for communicating with other devices in the system environment 101, as described with respect to FIG. 1. The computing device 500 can include various devices for performing one or more operations described above with reference to FIGS. 1-4.

The computing device 500 can include a processor 502 that can be communicatively coupled to a memory 504. The processor 502 can execute computer-executable program code stored in the memory 504, can access information stored in the memory 504, or a combination thereof. Program code may include machine-executable instructions that may represent a procedure, a function, a subprogram, a program, a routine, a subroutine, a module, a software package, a class, or any combination of instructions, data structures, or program statements, or other suitable types of machine-executable instructions. A code segment may be coupled to another code segment or a hardware circuit by passing or receiving information, data, arguments, parameters, or memory contents. Information, arguments, parameters, data, and the like may be passed, forwarded, or transmitted via any suitable means including memory sharing, message passing, token passing, network transmission, and other suitable means.

Examples of the processor 502 can include a microprocessor, an application-specific integrated circuit (ASIC), a field-programmable gate array (FPGA), or any other suitable processing device. The processor 502 can include any number of processing devices, including one. The processor 502 can include or communicate with the memory 504. The memory 504 can store program code that, when executed by the processor 502, can cause the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, a memory chip, optical storage, flash memory, storage class memory, ROM, RAM, an ASIC, magnetic storage, or any other medium from which a computer processor can read program code, execute program code, or a combination thereof. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, and the like.

The computing device 500 may additionally include a number of external or internal devices such as input devices, output devices, or a combination thereof. For example, the computing device 500 is illustrated in FIG. 5 with an input/output interface 508 that can receive input from input devices or provide output to output devices. A bus 506 can be included in the computing device 500. The bus 506 can communicatively couple one or more components of the computing device 500.

The computing device 500 can execute program code 514 that can include aspects of the network security system 100, such as the transaction logger 210, the risk module 240, or the access control subsystem 150. The program code 514 for aspects of the network security system 100 may be resident in any suitable computer-readable medium and may be executed on any suitable processing device. For example, as illustrated in FIG. 5, the program code 514 for the transaction logger 210, the risk module 240, or the access control subsystem 150 can reside in the memory 504 of the computing device 500 along with program data 516 associated with the program code 514, such as data included in the transaction log 220 or the traffic store 230. Executing the risk module 240 or other suitable component of the network security system 100 can configure the processor 502 to perform the operations described herein.

In some aspects, the computing device 500 can include one or more output devices. One example of an output device can include a network interface device 510. The network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include a presentation device 512. The presentation device 512 can include any device or group of devices suitable for providing visual, auditory, or other suitable sensory output. Non-limiting examples of the presentation device 512 can include a touchscreen, a monitor, a speaker, a separate mobile computing device, or other suitable presentation devices. In some aspects, the presentation device 512 can include a remote client-computing device that communicates with the computing device 500 using one or more data networks described herein. In other aspects, the presentation device 512 can be omitted.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
accessing a traffic attribute describing a characteristic of network traffic;
determining a baseline distribution of the traffic attribute over a baseline set of transactions involving an online system over a baseline period by applying a first filter with a first timescale and a second filter with a second timescale to the traffic attribute in the baseline set of transactions over a baseline period;
determining an observed distribution for the traffic attribute of an observed set of transactions involving the online system over an observed period;
computing an attribute risk value for the traffic attribute based on a comparison of a first mean of the observed distribution and a second mean of the observed distribution with a first mean of the baseline distribution and a second mean of the baseline distribution, wherein the first mean of the observed distribution and the first mean of the baseline distribution are based on the first timescale, and the second mean of the observed distribution and the second mean of the baseline distribution are based on the second timescale;
detecting that an anomaly exists in the traffic attribute of the observed set of transactions, based on the attribute risk value; and
implementing an access control for access to the online system by additional transactions having a particular value in the traffic attribute meeting a pattern of the anomaly.

2. The method of claim 1, wherein the first timescale is larger than the second timescale.

3. The method of claim 1, wherein determining the baseline distribution for the traffic attribute by applying the first filter with the first timescale comprises:
computing respective frequencies of one or more values of the traffic attribute at which the one or more values appear in the baseline set of transactions over the first timescale; and
computing, for the traffic attribute, a first mean of the frequencies.

4. The method of claim 3, wherein determining the baseline distribution for the traffic attribute further comprises:
computing respective frequencies of one or more values of the traffic attribute at which the one or more values appear in the baseline set of transactions over the second timescale; and
computing, for the traffic attribute, a second mean of the frequencies; and
computing the attribute risk value comprises comparing the observed distribution to a function of (i) the first mean of the frequencies and (ii) the second mean of the frequencies.

5. The method of claim 1, wherein determining the observed distribution for the traffic attribute comprises computing, for a feature of the traffic attribute, a first mean frequency at which the feature appears in the observed set of transactions occurring over the first timescale.

6. The method of claim 5, wherein determining the observed distribution for the traffic attribute further comprises applying exponential smoothing to compute the first mean frequency at which the feature appears in the observed set of transactions occurring over the first timescale.

7. The method of claim 5, wherein:
determining the observed distribution for the traffic attribute further comprises computing, for the feature of the traffic attribute, a second mean frequency at which the feature appears in the observed set of transactions occurring over the second timescale; and
computing the attribute risk value comprises comparing the baseline distribution to a function of (i) the first mean frequency at which the feature appears in the observed set of transactions over the first timescale and (ii) the second mean frequency at which the feature appears in the observed set of transactions occurring over the second timescale.

8. The method of claim 1, wherein detecting that the anomaly exists in the traffic attribute of the observed set of transactions comprises determining a combined risk value for the observed set of transactions, wherein the combined risk value is based on the attribute risk value aggregated with other attribute risk values.

9. The method of claim 1, wherein computing, using the observed distribution and the baseline distribution, an attribute risk value for the traffic attribute comprises comparing the observed distribution to the baseline distribution.

10. The method of claim 1, wherein implementing the access control comprises blocking the additional transactions.

11. The method of claim 1, wherein implementing the access control comprises challenging one or more transactions associated with the traffic attribute by requesting additional authentication information to complete the one or more transactions.

12. A system comprising;
a processor; and a non-transitory computer-readable medium comprising instructions that are executable by the processor to cause the processor to perform operations comprising:
   accessing a traffic attribute describing a characteristic of network traffic;
   determining a baseline distribution for the traffic attribute of a baseline set of transactions involving an online system, by applying a first filter with a first timescale and a second filter with a second timescale to the traffic attribute in the baseline set of transactions over a baseline period;
   determining an observed distribution for the traffic attribute of an observed set of transactions involving the online system over an observed period;
   computing an attribute risk value for the traffic attribute based on a comparison of a first mean of the observed distribution and a second mean of the observed distribution with a first mean of the baseline distribution and a second mean of the baseline distribution, wherein the first mean of the observed distribution and the first mean of the baseline distribution are based on the first timescale, and the second mean of the observed distribution and the second mean of the baseline distribution are based on the second timescale;
   detecting that an anomaly exists in the traffic attribute of the observed set of transactions, based on the attribute risk value; and
   implementing an access control for access to the online system by additional transactions having a particular value in the traffic attribute meeting a pattern of the anomaly.

13. The system of claim 12, wherein determining the baseline distribution for the traffic attribute further comprises:
   computing respective frequencies of one or more values of the traffic attribute at which the one or more values appear in the baseline set of transactions over the first timescale; and
   applying exponential smoothing to compute a first mean of the frequencies.

14. The system of claim 13, wherein determining the observed distribution for the traffic attribute comprises computing additional respective frequencies of one or more values of the traffic attribute in the observed set of transactions.

15. The system of claim 12, wherein detecting that the anomaly exists in the traffic attribute of the observed set of transactions comprises determining a combined risk value for the observed set of transactions, wherein the combined risk value is based on the attribute risk value aggregated with other attribute risk values.

16. The system of claim 12, wherein computing, using the observed distribution and the baseline distribution, an attribute risk value for the traffic attribute comprises comparing the observed distribution to the baseline distribution.

17. A non-transitory computer-readable storage medium having program code that is executable by a processor device to cause the processing device to perform operations comprising;
   accessing a traffic attribute describing a characteristic of network traffic;
   determining a baseline distribution for the traffic attribute of a baseline set of transactions involving an online system, by applying a first filter with a first timescale and a second filter with a second timescale to the traffic attribute in the baseline set of transactions over a baseline period;
   determining an observed distribution for the traffic attribute of an observed set of transactions involving the online system over an observed period;
   computing an attribute risk value for the traffic attribute based on a comparison of a first mean of the observed distribution and a second mean of the observed distribution with a first mean of the baseline distribution and a second mean of the baseline distribution, wherein the first mean of the observed distribution and the first mean of the baseline distribution are based on the first timescale, and the second mean of the observed distribution and the second mean of the baseline distribution are based on the second timescale;
   detecting that an anomaly exists in the traffic attribute of the observed set of transactions, based on the attribute risk value; and
   implementing an access control for access to the online system by additional transactions having a particular value in the traffic attribute meeting a pattern of the anomaly.

18. The non-transitory computer-readable storage medium of claim 17, wherein:
   determining the baseline distribution for the traffic attribute further comprises:
   computing respective frequencies of one or more values of the traffic attribute at which the one or more values appear in the baseline set of transactions over the first timescale;
   applying exponential smoothing to compute the first mean of the frequencies; and
   determining the observed distribution for the traffic attribute comprises computing additional respective frequencies of one or more values of the traffic attribute in the observed set of transactions.

19. The non-transitory computer-readable storage medium of claim 17, wherein detecting that the anomaly exists in the traffic attribute of the observed set of transactions comprises determining a combined risk value for the observed set of transactions, wherein the combined risk value is based on the attribute risk value aggregated with other attribute risk values.

20. The non-transitory computer-readable storage medium of claim 19, wherein detecting that the anomaly exists in the traffic attribute of the observed set of transactions further comprises:
   determining that the combined risk value meets a combined threshold; and
   comparing the attribute risk value to a threshold risk attribute, based on the combined risk value meeting the combined threshold.

* * * * *